United States Patent [19]

Wegner

[11] 4,275,171
[45] Jun. 23, 1981

[54] METHOD FOR PRODUCING FLAME RETARDANT FLEXIBLE POLYURETHANE FOAMS WITH BLENDS OF DIBROMONEOPENTYL GLYCOL AND FLAME RETARDANT PLASTICIZER

[75] Inventor: Gunter H. Wegner, Charlotte, N.C.

[73] Assignee: Reeves Brothers, Inc., Charlotte, N.C.

[21] Appl. No.: 29,340

[22] Filed: Apr. 12, 1979

[51] Int. Cl.$^3$ ............................................ C08G 18/14
[52] U.S. Cl. .................................. 521/107; 521/108; 521/171
[58] Field of Search ...................... 521/107, 108, 171

[56] References Cited

U.S. PATENT DOCUMENTS

| | | | |
|---|---|---|---|
| 3,933,693 | 1/1976 | Priest et al. | 521/160 |
| 4,052,346 | 10/1977 | Rudner et al. | 521/121 |
| 4,194,068 | 3/1980 | Miller et al. | 521/108 |

OTHER PUBLICATIONS

Miller, "Neopentyl Bromide Based Flame Retardants for Urethane Foams," Presented at 24th Annual Technical Conf., SPI Urethane Division, Dow Chemical, USA, Oct. 26, 1978.

*Primary Examiner*—Maurice J. Welsh
*Attorney, Agent, or Firm*—Pennie & Edmonds

[57] ABSTRACT

This invention is directed to a process for producing flame retardant flexible polyurethane foams having a porosity in the range between 0.5 and 10 cubic feet per minute. A polyol having an average molecular weight between about 250 and about 6,500 is reacted with toluene diisocyanate which comprises a mixture of the isomers of 2,4- and 2,6- toluene diisocyanate. The concentration of 2,4-toluene diisocyanate isomer is not critical. The formulation of the present invention includes a flame retardant mixture of a plasticizer and dibromoneopentyl glycol. The plasticizer is either a halogenated phosphonate or halogenated phosphate ester. Chlorine is the preferred halogen atom. The weight ratio of those ingredients is between about 50/50 and about 90/10 with the ratio 85/15 preferred. The concentration of that mixture is from about 1 to about 20 percent by weight of the polyol. Other ingredients that can be included in this formulation are water, a silicone surfactant, a tertiary amine catalyst, a tertiary amine co-catalyst, an auxiliary blowing agent and a tin catalyst. This process results in foam products that are flame retardant and suitable for automotive and furniture applications.

11 Claims, No Drawings

4,275,171

METHOD FOR PRODUCING FLAME RETARDANT FLEXIBLE POLYURETHANE FOAMS WITH BLENDS OF DIBROMONEOPENTYL GLYCOL AND FLAME RETARDANT PLASTICIZER

TECHNICAL FIELD

This invention is directed to production of flexible polyurethane foams by a process involving the reaction of toluene diisocyanate (TDI) with polyol or polyol blends in the presence of other ingredients such as blowing agents, silicone surfactants and accelerating agents. Specifically, this invention provides an improved method for flame retarding polyurethane foams by incorporating a mixture of dibromoneopentyl glycol (DBNG) and a non-reactive organic additive which acts as a flame retardant plasticizer when dissolved or dispersed into a foamy matrix regardless of the concentration of the isomers in the TDI. These foams are suitable for automotive and furniture applications.

BACKGROUND ART

Flexible polyurethane foams made from TDI and polyester or polyether polyols, comprise a significant portion of the polyurethane foam industry. Because those foams are combustible, burn uncontrollably after ignition, there have been extensive efforts in that industry to produce foams that are flame retardant.

Open-cell flexible polyurethane foams are more difficult to flame-proof than closed-cell, rigid foams, because open-cell foams allow oxygen to be transferred through it to the location where the foam has been ignited. Also, such foams permit volatilized flame retardant to escape.

Many different methods have been taught in the prior art for flame retarding flexible polyurethane foams. All these methods involve addition to the foam reactants of a flame retardant prior to or during the polymerization reaction so that the flame retardant is uniformly distributed throughout the foam. A detailed discussion of that prior art is found in U.S. Pat. No. 3,933,693 to David C. Priest and John E. Brandien, which is incorporated by reference here.

That patent was directed to an improvement over the prior art. Specifically, Priest and Brandien discovered a method to incorporate DBNG in flexible polyether polyurethane foam systems without obtaining closed-cell structures. Prior art attempts to incorporate that glycol resulted in foams having closed-cell structures and physical properties unsuitable for many uses. However, this improvement over the prior art was restricted to foams made from TDI containing no more than about 76 percent by weight of a 2,4-toluene diisocyanate isomer. Priest and Brandien were unable to use higher concentrations of that isomer probably because use of DBNG in polyurethane foam systems, without a flame retardant plasticizer, contained an inherent problem with the inability of the foamer to obtain high porosity foam using higher concentrations of that isomer. The present invention is not so restricted and yet obtains the physical characteristics achieved by the Priest and Brandien invention.

DISCLOSURE OF INVENTION

This invention is directed to a process for producing flame retardant polyurethane foams from polyester or polyether polyols and TDI, regardless of the concentration of the 2,4-toluene diisocyanate isomer therein, which have a porosity between about 0.5 and about 10 cubic feet per minute. The polyol and TDI formulation includes a mixture of flame retardant plasticizer and DBNG. The combination of this plasticizer and DBNG results in a synergistic system that is substantially more efficient than the plasticizer without DBNG. The plasticizer can be a halogenated phosphonate or halogenated phosphate ester. A preferable weight ratio for those ingredients is about 85/15; a preferable concentration for the mixture is between about 2 to about 15 percent by weight of the polyol. A process utilizing a formulation containing these ingredients results in a product having physical properties suitable for the automotive and furniture industries.

In view of this discovery, the subject invention comprises an improvement in processes for producing flexible polyurethane foams, which have porosities in the range from about 0.5 to about 10 cubic feet per minute, in which an isomer mixture of 2,4- and 2,6-toluene diisocyanate is reacted with a polyester or polyether polyol or blends thereof in the presence of a blowing agent, such as water or a low boiling chemical like fluorocarbon or methylene chloride, silicone surfactant and accelerating agents such as amine and tin catalysts. A mixture of DBNG and a flame retardant plasticizer in an amount from about 1 to about 20 percent by weight of the polyol in the polymerization reaction is incorporated into the reaction mixture prior to polymerization. A flame retardant polyurethane foam is produced.

BEST MODE FOR CARRYING OUT THE INVENTION

Generally, a conventional reaction takes place in the subject process. The reaction conditions such as temperature, pressure and order of addition are not critical, and well-known in the prior art.

Of course, the present process includes the reaction of TDI with a polyether or a polyester polyol. Included in that reaction is a mixture of DBNG and a flame retardant plasticizer. Some other ingredients can be included such as water, silicone surfactant, tertiary amine catalyst or co-catalyst, auxiliary blowing agent and a tin catalyst if a polyether comprises the polyol. A typical formulation used in the present invention follows; concentrations are expressed in parts by weight per hundred parts by weight polyol:

| Reactant | Concentration(s) |
| --- | --- |
| Polyol | 100 |
| TDI Index | 80–120 |
| Plasticizer/DBNG | 1–20 |
| Water | 1–5.5 |
| Silicone Surfactant | 0.2–3 |
| Tertiary Amine Catalyst | .02–2 |
| Tertiary Amine Co-Catalyst | .02–2 |
| Auxiliary Blowing Agent | 0.5–40 |
| Tin Catalyst | .05–.5 |

Preferred concentrations for the plasticizer/DBNG mixture and water are from about 2 to about 15 and from about 1.75 to about 4.5, respectively. The weight ratio for the mixture is from about 50/50 to about 90/10; the ratio 85/15 is preferred.

Polyether polyols which are poly(propylene oxide/ethylene oxide) triols having average molecular weights in the range from about 250 to about 6,500, can be used in the present invention. VORNOL 2026 and 3140, sold by Dow Chemical Company, which have average molecular weights of 255 and 3,500, respectively, are such polyols. MULTRANOL 7100, 3900 and 3901 which have average molecular weights of 3,500, 5,000 and 6,000, respectively, sold by Mobay Chemical Company, are other polyols that can be used in the present process. Olin Chemical Company, Wyandotte Chemical Company and Jefferson Chemical Company sell other suitable polyols. Additional polyols, such as glycerol, hexane triol, butane triol, trimethylol propane, trimethylol ethane and pentaerythritol, can be included in the polymerization reaction with the polyether polyol to maintain a desirable stoichiometrically balanced —NCO/—OH ratio, which should be in the range from about 1:0.8 to about 1.2:1. A suitable polyester polyol is made by Witco Chemical Corporation and called Witco FOMREZ 50. This polyol is a glycol-adipate polyester resin.

Conventionally, the TDI used in the subject invention contains isomers of 2,4- and 2,6- toluene diisocyanate. The concentration of these isomers is not critical. Usually, a ratio of 80/20 TDI preferably has an index of between about 80 to about 120. Suitable TDI is sold by Mobay Chemical Company under the tradename MONDUR TD-80 and by Dupont Chemical Company under the tradename HYLENE TM.

The plasticizers are halogenated phosphonate and halogenated phosphate esters. Chlorinated plasticizers are preferred, but other halogen atoms, such as bromine, can be utilized. ANTIBLAZE 78, sold by Mobil Chemical Company, is a chlorinated phosphonate ester which can be used. FYROL FR-2 and FYROL EFF sold by Stauffer Chemical Company, THERMOLIN 101 sold by Olin Chemical Company and PHOSGARD 2×C20 sold by Monsanto Chemical Company are chlorinated phosphate esters that can be used as plasticizers. FIREMASTER LV-T23P is a brominated phosphate ester sold by Velsicol Chemical Corporation.

DNBG is a solid having a melting point of 110° C. FR 1138, sold by Dow Chemical Company, is such a dibromoneopentyl glycol. Useful weight ratios of plasticizer to DBNG are mentioned above. The desirable and preferred concentrations for their mixture are also mentioned above.

The flame retardant mixture can be a solution or a dispersion. Incorporating the mixture in the form of a solution is preferred.

The concentration of water varies between about 1 to about 5.5 parts by weight, preferably between about 1.75 and about 4.5 parts by weight, of the polyol. Generally, as the water concentration in the foam formulation is increased, there is an attendant increase in the concentration of the plasticizer/DBNG mixture required to flame-proof the foam.

The remaining ingredients of a polyether foam formulation comprise a silicone surfactant, a tertiary amine catalyst and a tin catalyst. The formulation can include blends of polyether polyols, a tertiary amine co-catalyst and an auxiliary blowing agent. L5740, sold by Union Carbide Corporation, is a silicone surfactant that can be used in the present foam formulation; its concentration should be about 0.6 parts by weight. A-1, also sold by Union Carbide Corporation, is a tertiary amine catalyst that can be included in the formulation; its concentration should be about 0.1 parts by weight. The tin catalyst is a conventional stannous octoate catalyst whose concentration should be about 0.2 parts by weight. Typically, the tin catalyst is included in the formulation by use of a carrier. The carrier can be a plasticizer or the polyol. One part by weight of the tin catalyst is usually added to 2 parts by weight of the carrier. FOMREZ C2 sold by Witco Chemical Company and T-9 sold by M&T Chemicals are suitable tin catalysts. DABCO LV-33, sold by Air Products, is a tertiary amine co-catalyst useful in this formulation. This co-catalyst can also be used as the sole amine catalyst. FREON II B, trichlorofluoromethane, can be used as an auxiliary blowing agent.

The remaining ingredients of a polyester foam formulation comprise an organosilicone surfactant, tertiary amine catalysts, and auxiliary blowing agent. L536, sold by Union Carbide Corporation, is a silicone surfactant that can be used with the polyester foam formulation; its concentration should be about 1.5 parts by weight. B-16 sold by Lonza Chemical Company and NEM sold by Jefferson Chemical Company are tertiary amine catalysts that can be used with polyester formulations.

The use of conventional adjuvants employed in the production of polyurethanes, such as polymerization and gelation catalyst, emulsifiers, and foam stabilizers do not interfere with the present invention process. Various antioxidants may also be incorporated into the formulation as a stabilizer.

EXAMPLES

The following examples illustrate the ease with which flame retardant flexible polyurethane foams may be produced from polyols and toluene diisocyanate in accordance with the present invention. In each of these examples, each component of the foam formulation is expressed in parts by weight per hundred parts by weight of polyol (php) unless otherwise indicated. Where trade names or trademarks are used to denote a particular component of the foam formulation, those components may be identified from this list:

A-1 is a tertiary amine catalyst, sold by Union Carbide Company, which is a 70 percent solution of bis(-dimethylaminoethyl) ether in dipropylene glycol.

ANTIBLAZE 78 is a chlorinated phosphonate ester sold by Mobil Chemical Company.

B-16 is a tertiary amine catalyst comprising a dimethyl cetyl amine sold by Lonza Chemical Company.

NEM is a tertiary amine catalyst, sold by Jefferson Chemical Company, which is N-ethyl morpholine.

DBNG is a dibromoneopentyl glycol.

FIREMASTER LV-T23P is a brominated phosphate ester sold by Velsicol Chemical Corporation.

FYROL EFF and FYROL FR-2 are chlorinated phosphate esters sold by Stauffer Chemical Company.

L5740 and L536 are silicone surfactants sold by Union Carbide Company.

PHOSGARD 2×C20 is a chlorinated phosphate ester sold by Monsanto Chemical Company.

80/20 TDI is a toluene diisocyanate containing about 80 percent of 2,4-toluene diisocyanate and about 20 percent 2,6-toluene diisocyanate.

THERMOLIN 101 is a chlorinated phosphate ester sold by Olin Chemical Company.

T-9 is a stannous octoate catalyst sold by M&T Chemicals.

VORNOL 3140 is a copolymer of ethelene oxide and propylene oxide sold by Dow Chemical Company and has an average molecular weight of 3,500.

Witco FOMREZ 50 is a glycol-adipate polyester resin sold by Witco Chemical Corporation.

Some terminology that appears below can be identified from this list:

CT means creamtime which is a visual indication of an extreme porosity change in the foaming system. The formulation undergoes a change from a clear liquid to an opaque, creamy system. Initiation of foam rise occurs at the creamtime.

RT means risetime which is the point at which the foaming mass ceases to rise and is indicative of how soon the foam product may be handled.

BD means burn distance which is the distance in inches that the foam sample actually burned.

Burn rate is the burn distance divided by the burn time and is calculated after 1.5 inches have burned.

Density is measured in lb/ft$^3$.

Porosity is measured in ft$^3$/min.

Different test procedures were used in evaluating the foam product. Motor Vehicle Safety Standard Docket 302 (MVSS) is a horizontal flammability test in which a foam sample is horizontally displaced a certain distance above a gas flame. A burn rate of 4 inches per minute is required to pass this test. Fisher Body TM 32-12 (Fisher Body) is another horizontal flammability test, which requires a burn rate of 2.5 inches per minute or less to pass fire retardant specifications. Fisher Body TM 32-10 test requires accelerated aging of test samples prior to a flammability test and was used to prepare samples evaluated according to the Fisher Body TM 32-12 test. The TM 32-10 test is a cyclic test involving dry heat, humid aging and exposure to extreme cold. The duration of this accelerated aging test is over a two week period. The latter flammability test represents the more stringent requirements of the automotive industry.

EXAMPLE I

The following foam formulation was utilized to show the effect of varying the concentration of an 80/20 FYROL EFF/DBNG mixture on the physical properties of a polyether foam product. The concentration of water was also varied.

| Reactant | Concentration |
|---|---|
| VORNOL 3140 | 100 |
| 80/20 TDI Index | 110 |
| 80/20 FYROL EFF/DBNG | Varied |
| H$_2$O | Varied |
| L5740 Surfactant | 0.6 |
| A-1 Catalyst | 0.1 |
| T-9 Catalyst | 0.22 |

These reactants in the above concentrations were mixed in a conventional manner. The 80/20 FYROL EFF/DBNG mixture was included in the form of a solution. The reaction conditions used were conventional and well-known to those skilled in the art. Samples from the foam product were evaluated and the results appear below.

TABLE I

| Experiment | | 1 | 2 | 3 | 4 | 5 | 6 | 7 | 8 | 9 | 10 |
|---|---|---|---|---|---|---|---|---|---|---|---|
| REACTANTS | 80/20 FYROL EFF/DBNG | 1 | 3 | 5 | 7 | 9 | 1 | 3 | 5 | 7 | 9 |
| | H$_2$O | 3 | 3 | 3 | 3 | 3 | 4 | 4 | 4 | 4 | 4 |
| Experiment | | 1 | 2 | 3 | 4 | 5 | 6 | 7 | 8 | 9 | 10 |
| PROPERTIES | CT | 10 | 10 | 10 | 10 | 10 | 10 | 10 | 11 | 11 | 11 |
| | RT | 133 | 139 | 142 | 148 | 155 | 97 | 97 | 106 | 110 | 106 |
| | BD (MVSS) | 4.85 | 1.35 | 0.7 | 0.63 | 0.40 | 5.55 | 5.55 | 1.15 | .68 | .60 |
| | BD (Fisher Body) | — | 1.1 | 0.6 | 0.5 | 0.25 | — | 4.8 | 1.45 | 1.1 | 1.0 |
| | density | 1.99 | 2.01 | 2.02 | 2.05 | 2.08 | 1.56 | 1.55 | 1.58 | 1.61 | 1.63 |
| | porosity | 4.60 | 4.07 | 4.10 | 4.53 | 4.93 | 4.30 | 4.30 | 4.40 | 4.60 | 4.70 |

EXPERIMENT II

Experiment I was repeated except that the weight ratio of FYROL EFF to DBNG was changed to 85/15. The results are tabulated in Table II:

TABLE II

| Experiment | | 11 | 12 | 13 | 14 | 15 | 16 | 17 | 18 | 19 | 20 |
|---|---|---|---|---|---|---|---|---|---|---|---|
| REACTANTS | 85/15 FYROL EFF/DBNG | 1 | 3 | 5 | 7 | 9 | 1 | 3 | 5 | 7 | 9 |
| | H$_2$O | 3 | 3 | 3 | 3 | 3 | 4 | 4 | 4 | 4 | 4 |
| Experiment | | 11 | 12 | 13 | 14 | 15 | 16 | 17 | 18 | 19 | 20 |
| PROPERTIES | CT | 9 | 10 | 10 | 10 | 11 | 8 | 9 | 8 | 9 | 9 |
| | RT | 102 | 110 | 109 | 114 | 140 | 99 | 90 | 98 | 93 | 103 |
| | BD (MVSS) | 3.50 | .66 | .70 | .30 | .30 | 6.0 | 5.4 | 1.05 | .80 | .58 |
| | BD (Fisher Body) | 3.36 | 1.15 | .56 | .33 | .33 | 6.1 | 3.53 | .85 | .98 | .60 |
| | density | 2.06 | 2.00 | 1.89 | 1.93 | 2.01 | 1.52 | 1.56 | 1.59 | 1.58 | 1.63 |
| | porosity | 1.53 | 3.90 | 4.60 | 3.53 | 1.01 | 5.30 | 3.33 | 3.97 | 3.93 | 2.80 |

EXPERIMENT III

Experiment I was repeated except that the weight ratio of FYROL EFF was changed to 90/100. The results are tabulated in Table III:

TABLE III

| | Experiment | 21 | 22 | 23 | 24 | 25 | 26 |
|---|---|---|---|---|---|---|---|
| REACTANTS | 90/10 FYROL EFF/DBNG | 5 | 7 | 9 | 5 | 7 | 9 |
| | H$_2$O | 3 | 3 | 3 | 4 | 4 | 4 |
| | Experiment | 21 | 22 | 23 | 24 | 25 | 26 |
| PROPERTIES | CT | 9 | 10 | 10 | 10 | 10 | 10 |
| | RT | 112 | 110 | 116 | 98 | 101 | 94 |
| | BD (MVSS) | .60 | .40 | .30 | 2.8 | .30 | .70 |
| | BD (Fisher Body) | .60 | .56 | .36 | 1.9 | .60 | .80 |
| | density | 2.03 | 1.98 | 2.05 | 1.61 | 1.67 | 1.60 |
| | porosity | 4.17 | 4.57 | 4.63 | 5.07 | 3.87 | 2.23 |

EXPERIMENT IV

Experiment I was again repeated except that the plasticizer ANTIBLAZE 78 was used. The results appear in Table IV:

TABLE IV

| | Experiment | 27 | 28 | 29 | 30 | 31 | 32 | 33 | 34 | 35 | 36 |
|---|---|---|---|---|---|---|---|---|---|---|---|
| REACTANTS | 80/20 ANTIBLAZE 78/DBNG | 1 | 3 | 5 | 7 | 9 | 1 | 3 | 5 | 7 | 9 |
| | H$_2$O | 3 | 3 | 3 | 3 | 3 | 4 | 4 | 4 | 4 | 4 |
| | Experiment | 27 | 28 | 29 | 30 | 31 | 32 | 33 | 34 | 35 | 36 |
| PROPERTIES | CT | 11 | 11 | 11 | 11 | 11 | 11 | 11 | 11 | 10 | 10 |
| | RT | 102 | 94 | 96 | 112 | 111 | 89 | 94 | 94 | 81 | 80 |
| | BD (MVSS) | 4.1 | .65 | .60 | .40 | .30 | 5.75 | 5.75 | .83 | .80 | .35 |
| | BD (Fisher Body) | — | .70 | .62 | .62 | .50 | — | 5.9 | 1.5 | .85 | .70 |
| | density | 1.92 | 1.74 | 1.72 | 1.90 | 1.93 | 1.62 | 1.40 | 1.57 | 1.56 | 1.47 |
| | porosity | 2.2 | 1.0 | .63 | .61 | 2.6 | 2.4 | 1.8 | 3.6 | 1.5 | .55 |

EXPERIMENT V

Experiment IV was repeated except that the weight ratio of ANTIBLAZE 78 to DBNG was changed to 85/15. The results are tabulated in Table V:

TABLE V

| | Experiment | 37 | 38 | 39 | 40 | 41 | 42 | 43 | 44 | 45 | 46 |
|---|---|---|---|---|---|---|---|---|---|---|---|
| REACTANTS | 85/15 ANTIBLAZE 78/DBNG | 1 | 3 | 5 | 7 | 9 | 1 | 3 | 5 | 7 | 9 |
| | H$_2$O | 3 | 3 | 3 | 3 | 3 | 4 | 4 | 4 | 4 | 4 |
| | Experiment | 37 | 38 | 39 | 40 | 41 | 42 | 43 | 44 | 45 | 46 |
| PROPERTIES | CT | 9 | 9 | 9 | 9 | 9 | 8 | 8 | 8 | 8 | 8 |
| | RT | 101 | 96 | 102 | 102 | 111 | 99 | 78 | 91 | 80 | 89 |
| | BD (MVSS) | 4.1 | .65 | .40 | .30 | .20 | 6.15 | 5.4 | 2.0 | .70 | .65 |
| | BD (Fisher Body) | 4.4 | .75 | .56 | .48 | .38 | 6.1 | 6.0 | 4.8 | 1.08 | .98 |
| | density | 1.97 | 1.93 | 1.92 | 1.97 | 1.94 | 1.57 | 1.55 | 1.57 | 1.58 | 1.60 |
| | porosity | 3.2 | 2.5 | 1.3 | .96 | 3.4 | 6.0 | 5.5 | 4.4 | 2.2 | 3.8 |

EXPERIMENT VI

Experiment IV was again repeated except that the weight ratio of ANTIBLAZE 78 to DBNG was changed to 90/10. The results appear in Table VI:

TABLE VI

| | Experiment | 47 | 48 | 49 | 50 | 51 | 52 |
|---|---|---|---|---|---|---|---|
| REACTANTS | 90/10 ANTIBLAZE 78/DBNG | 5 | 7 | 9 | 5 | 7 | 9 |
| | H$_2$O | 3 | 3 | 3 | 4 | 4 | 4 |
| | Experiment | 47 | 48 | 49 | 50 | 51 | 52 |
| PROPERTIES | CT | 10 | 10 | 10 | 10 | 10 | 10 |
| | RT | 112 | 112 | 110 | 105 | 89 | 103 |
| | BD (MVSS) | .85 | .58 | .28 | 1.75 | .86 | .65 |
| | BD (Fisher Body) | .90 | .80 | .65 | 4.3 | 4.1 | 1.5 |
| | density | 1.85 | 1.92 | 1.88 | 1.48 | 1.51 | 1.55 |
| | porosity | 3.87 | 2.87 | 2.23 | 1.10 | .92 | 1.60 |

EXPERIMENT VII

Experiment V was repeated except that the plasticizer THERMOLIN 101 was used. The results are tabulated in Table VII:

TABLE VII

| | Experiment | 53 | 54 | 55 | 56 | 57 | 58 | 59 | 60 | 61 | 62 |
|---|---|---|---|---|---|---|---|---|---|---|---|
| REACTANTS | 80/20 THERMOLIN 101/DBNG | 1 | 3 | 5 | 7 | 9 | 1 | 3 | 5 | 7 | 9 |
| | H$_2$O | 3 | 3 | 3 | 3 | 3 | 4 | 4 | 4 | 4 | 4 |

TABLE VII-continued

| Experiment | | 53 | 54 | 55 | 56 | 57 | 58 | 59 | 60 | 61 | 62 |
|---|---|---|---|---|---|---|---|---|---|---|---|
| PROPERTIES | CT | 13 | 12 | 13 | 13 | 11 | 10 | 10 | 10 | 11 | 11 |
| | RT | 121 | 120 | 126 | 125 | 126 | 99 | 98 | 93 | 102 | 102 |
| | BD (MVSS) | 5.1 | .70 | .68 | .56 | .30 | 6.2 | 5.2 | 2.6 | .8 | .2 |
| | BD (Fisher Body) | 2.81 | .71 | .70 | .23 | .20 | 5.88 | 4.78 | 1.55 | .46 | .60 |
| | density | 1.98 | 1.96 | 2.02 | 1.91 | 2.03 | 1.62 | 1.62 | 1.61 | 1.59 | 1.66 |
| | porosity | 5.10 | 5.23 | 4.53 | 4.60 | 2.53 | 5.47 | 3.73 | 5.30 | 5.87 | 4.77 |

EXPERIMENT VIII

Experiment VII was repeated except that the weight ratio of THERMOLIN 101 to DBNG was changed to 85/15. The results appear in Table VIII:

TABLE VIII

| Experiment | | 63 | 64 | 65 | 66 | 67 | 68 | 69 | 70 | 71 | 72 |
|---|---|---|---|---|---|---|---|---|---|---|---|
| REACTANTS | 85/15 THERMOLIN 101/ | | | | | | | | | | |
| | DBNG | 1 | 3 | 5 | 7 | 9 | 1 | 3 | 5 | 7 | 9 |
| | H$_2$O | 3 | 3 | 3 | 3 | 3 | 4 | 4 | 4 | 4 | 4 |
| Experiment | | 63 | 64 | 65 | 66 | 67 | 68 | 69 | 70 | 71 | 72 |
| PROPERTIES | CT | 11 | 11 | 11 | 11 | 11 | 12 | 12 | 12 | 12 | 12 |
| | RT | 123 | 125 | 130 | 121 | 126 | 105 | 99 | 99 | 101 | 101 |
| | BD (MVSS) | 5.0 | 5.15 | .73 | .51 | .30 | 5.96 | 6.46 | 3.81 | 1.88 | .70 |
| | BD (Fisher Body) | 4.26 | 4.88 | .90 | .35 | .23 | 6.06 | 5.93 | 3.46 | 1.06 | .90 |
| | density | 2.03 | 2.06 | 2.01 | 2.03 | 2.07 | 1.60 | 1.61 | 1.64 | 1.62 | 1.61 |
| | porosity | 4.40 | 4.20 | 4.17 | 2.87 | 3.20 | 5.57 | 5.73 | 5.13 | 5.50 | 5.00 |

EXPERIMENT IX

Experiment VII was repeated except that the weight ratio of THERMOLIN 101 to DBNG was changed to 90/10. The results are repeated in Table IX:

TABLE IX

| Experiment | | 73 | 74 | 75 | 76 | 77 | 78 |
|---|---|---|---|---|---|---|---|
| REACTANTS | 90/10 THERMOLIN 101/ | | | | | | |
| | DBNG | 5 | 7 | 9 | 5 | 7 | 9 |
| | H$_2$O | 3 | 3 | 3 | 4 | 4 | 4 |
| Experiment | | 73 | 74 | 75 | 76 | 77 | 78 |
| PROP- | CT | 13 | 13 | 13 | 11 | 11 | 11 |
| ERTIES | RT | 138 | 138 | 138 | 102 | 99 | 105 |
| | BD (MVSS) | .41 | .30 | .26 | .35 | .78 | .36 |
| | BD (Fisher Body) | .40 | .28 | .32 | .73 | .85 | .71 |
| | density | 2.14 | 2.19 | 2.12 | 1.61 | 1.69 | 1.63 |
| | porosity | .79 | .61 | .86 | 3.33 | 3.80 | 4.43 |

EXPERIMENT X

Experiment II was repeated except that the plasticizer PHOSGARD 2×C20 was used. The results appear in Table X:

TABLE X

| Experiment | | 79 | 80 | 81 | 82 | 83 | 84 | 85 | 86 | 87 | 88 |
|---|---|---|---|---|---|---|---|---|---|---|---|
| REACTANTS | 85/15 PHOSGARD 2XC20/ | | | | | | | | | | |
| | DBNG | 1 | 3 | 5 | 7 | 9 | 1 | 3 | 5 | 7 | 9 |
| | H$_2$O | 3 | 3 | 3 | 3 | 3 | 4 | 4 | 4 | 4 | 4 |
| Experiment | | 79 | 80 | 81 | 82 | 83 | 84 | 85 | 86 | 87 | 88 |
| PROPERTIES | CT | 12 | 12 | 13 | 13 | 13 | 11 | 11 | 11 | 12 | 12 |
| | RT | 129 | 132 | 147 | 141 | 138 | 96 | 94 | 100 | 101 | 98 |
| | BD (MVSS) | .83 | .78 | .61 | .58 | .50 | 6.03 | 4.56 | .95 | .76 | .72 |
| | BD (Fisher Body) | 2.1 | .70 | .50 | .45 | .30 | 5.6 | 4.30 | .76 | .60 | .55 |
| | density | 2.18 | 2.08 | 2.10 | 2.05 | 2.12 | 1.67 | 1.64 | 1.69 | 1.65 | 1.67 |
| | porosity | 3.10 | 2.20 | 1.40 | 1.00 | .83 | 2.36 | 3.26 | 2.20 | 1.60 | 1.40 |

EXPERIMENT XI

Experiment II was repeated except that the plasticizer FIREMASTER LV-T23P was used. The results appear in Table XI:

TABLE XI

| Experiment | | 89 | 90 | 91 | 92 | 93 | 94 | 95 | 96 | 97 | 98 |
|---|---|---|---|---|---|---|---|---|---|---|---|
| REACTANTS | 85/15 FIREMASTER LV-T23P/ DBNG | 1 | 3 | 5 | 7 | 9 | 1 | 3 | 5 | 7 | 9 |
| | H₂O | 3 | 3 | 3 | 3 | 3 | 4 | 4 | 4 | 4 | 4 |
| Experiment | | 89 | 90 | 91 | 92 | 93 | 94 | 95 | 96 | 97 | 98 |
| PROPERTIES | CT | 11 | 11 | 11 | 11 | 11 | 12 | 12 | 12 | 12 | 12 |
| | RT | 132 | 134 | 134 | 136 | 135 | 103 | 103 | 106 | 114 | 115 |
| | BD (MVSS) | 3.50 | 1.03 | .70 | .40 | .35 | 3.80 | 2.02 | 1.1 | .80 | .70 |
| | BD (Fisher Body) | 3.30 | .80 | .50 | .38 | .30 | 3.65 | 2.15 | .98 | .70 | .60 |
| | density | 2.01 | 2.03 | 2.05 | 2.00 | 2.06 | 1.57 | 1.59 | 1.59 | 1.63 | 1.65 |
| | porosity | 3.50 | 2.63 | 2.70 | 2.46 | 2.50 | 4.20 | 2.06 | 2.70 | 2.73 | 2.70 |

EXAMPLE XII

The following foam formulation was used to show the effect of varying the concentration of an 85/15 FYROL FR-2/DBNG mixture on the physical properties of a polyester foam product.

| Reactant | Concentration |
|---|---|
| Witco FOMREZ 50 | 100 |
| 80/20 TDI Index | 92 |
| 85/15 FYROL FR-2/DBNG | Varied |
| H₂O | 4 |
| L536 Surfactant | 1.5 |
| NEM Catalyst | 2.2 |
| B-16 Catalyst | 0.2 |

These reactants in the above concentrations were mixed in a conventional manner. The 85/15 FYROL FR-2 DBNG mixture was included in the form of a solution. The reaction conditions used were conventional and well-known to those skilled in the art. Samples from the foam product were evaluated and the results appear below.

TABLE XII

| Experiment | | 99 | 100 | 101 | 102 |
|---|---|---|---|---|---|
| REACTANT | 85/15 FYROL FR-2/ DBNG | 3 | 5 | 7 | 9 |
| | H₂O | 4 | 4 | 4 | 4 |
| Experiment | | 99 | 100 | 101 | 102 |
| PROPERTIES | CT | 8 | 8 | 8 | 8 |
| | RT | 163 | 159 | 144 | 146 |
| | BD (MVSS) | 2.40 | 1.40 | .80 | .80 |
| | BD (Fisher Body) | 2.80 | 1.50 | 1.0 | .80 |
| | density | 1.79 | 1.81 | 1.80 | 1.82 |
| | porosity | 1.0 | 1.2 | 1.1 | 1.0 |

It is not intended to limit the present invention to the specific embodiments described above. Other changes may be made in the formulation or process specifically described without departing from the scope and teachings of the present invention. The present invention is intended to encompass all other embodiments, alternatives and modifications consistent with this invention.

I claim:

1. In a process for producing flexible polyether or polyester polyurethane foams having a porosity in the range from about 0.5 to about 10 cubic feet per minute, in which an isomeric mixture of 2,4- and 2,6- toluene diisocyanate is reacted with a polyol in the presence of a small amount of water and a catalytic amount of polymerization catalyst, the improvement which comprises: incorporating as a separate reactant into the reaction mixture prior to polymerization from about 1 to about 20 percent by weight of a mixture of dibromoneopentyl glycol and flame retardant plasticizer based on the weight of the polyol used in the polymerization reaction, which manner of incorporating said mixture results in substantially more flame retardant foams without adversely affecting the physical characteristics of said foams.

2. The process for producing flame retardant flexible polyurethane foams according to claim 1, in which the polyol is a poly(propylene oxide/ethylene oxide) triol having an average molecular weight in the range from about 250 to about 6,500.

3. The process for producing flame retardant flexible polyurethane foams according to claim 1, in which the polyol is reacted with a sufficient amount of an isomeric mixture of toluene diisocyanate which contains more than about 76 percent by weight of 2,4-isomer.

4. The process for producing flame retardant flexible polyurethane foams according to claim 1, in which the dibromoneopentyl glycol/plasticizer mixture is incorporated in the reaction medium in the form of a solution.

5. The process for producing flame retardant flexible polyurethane foams according to claim 1, in which the dibromoneopentyl glycol/plasticizer mixture is incorporated in the form of a dispersion.

6. The process for producing flame retardant flexible polyurethane foams according to claim 1, in which from about 1 to about 5.5 percent by weight of water and from about 2 to about 15 percent by weight of dibromoneopentyl glycol/plasticizer mixture are used in the polymerization reaction.

7. The process for producing flame retardant flexible polyurethane foams according to claim 1, in which the weight ratio of plasticizer to dibromoneopentyl glycol is from about 50/50 to about 90/10.

8. The process for producing flame retardant flexible polyurethane foams according to claim 1, in which the weight ratio of plasticizer to dibromoneopentyl glycol is about 85/15.

9. The process for producing flame retardant flexible polyurethane foams according to claim 1, in which the plasticizer is a chlorinated phosphonate ester.

10. The process for producing flame retardant flexible polyurethane foams according to claim 1, in which the plasticizer is a chlorinated phosphate ester.

11. The process for producing flame retardant flexible polyurethane foams according to claim 1, in which the plasticizer is a brominated phosphate ester.

* * * * *